US006744761B1

(12) United States Patent
Neumann et al.

(10) Patent No.: US 6,744,761 B1
(45) Date of Patent: Jun. 1, 2004

(54) WORKFLOW MANAGER

(75) Inventors: Seth C. Neumann, Mountain View, CA (US); Sheldon J. Davis, Guelph (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,862

(22) Filed: Dec. 28, 1998

(51) Int. Cl.$^7$ ............................................... H04L 12/50
(52) U.S. Cl. ...................................... 370/389; 370/351
(58) Field of Search ............................... 370/356, 355, 370/358, 359, 389, 392, 351; 379/265, 142, 214

(56) References Cited

U.S. PATENT DOCUMENTS

| | | | |
|---|---|---|---|
| 5,185,782 A | * | 2/1993 | Srinivasan ................... 379/67 |
| 5,414,721 A | * | 5/1995 | Fukui |
| 5,592,542 A | | 1/1997 | Honda et al. |
| 5,675,637 A | * | 10/1997 | Szlam et al. ................ 379/142 |
| 5,675,733 A | | 10/1997 | Williams ................ 395/200.01 |
| 5,742,675 A | * | 4/1998 | Kilander et al. ............ 379/265 |
| 5,765,033 A | | 6/1998 | Miloslavsky ........... 395/200.36 |
| 5,793,861 A | | 8/1998 | Haigh ........................ 379/266 |
| 5,825,865 A | | 10/1998 | Oberlander et al. ........ 379/211 |
| 6,018,579 A | * | 1/2000 | Petrunka ..................... 379/285 |
| 6,046,762 A | * | 4/2000 | Sonesh et al. ................ 348/16 |
| 6,170,011 B1 | * | 1/2001 | Macleod Beck et al. ... 709/224 |
| 6,188,673 B1 | * | 2/2001 | Bauer et al. ................ 370/252 |
| 6,373,836 B1 | * | 4/2002 | Deryugin et al. ........... 370/352 |
| 6,385,193 B1 | * | 5/2002 | Civanlar et al. ............ 370/352 |
| 6,449,356 B1 | | 9/2002 | Dezonno |

FOREIGN PATENT DOCUMENTS

| | | |
|---|---|---|
| EP | 0 740 450 | 10/1996 |
| EP | 0 856 980 | 8/1998 |
| EP | 1 003 117 | 5/2000 |
| WO | WO 98/17041 | 4/1998 |

* cited by examiner

Primary Examiner—Kenneth Vanderpuye
(74) Attorney, Agent, or Firm—Kevin L. Smith

(57) ABSTRACT

A method and system for handling, that is routing and tracking, a plurality of incoming media streams of varying types—such as faxes, e-mail, Voice over IP, and others—is disclosed. The system analyzes the incoming media's type, header information and content and, in conjunction with other databases available within an enterprise, such as a human resources or customer information management databases, determines a plurality of suitable enterprise resources that may be able to adequately respond to said incoming media stream. The system may, again in conjunction with the enterprise databases, determine the availability of an identified enterprise resource and, if available, routes said incoming media stream to said identified and available resource. If the identified resource is unavailable, alternate resources are selected from said plurality of identified resources for possible routing of the incoming media stream. The system also tracks the disposition of the media stream by the identified and available resource, and if said disposition of said media stream does not occur within a predetermined time, the system increases the priority of said media stream and re-routes the media stream within the enterprise. The system also maintains a database of statistics relating to the receipt and disposition of incoming media streams.

18 Claims, 11 Drawing Sheets

FIG. 6

| Employee Name | Title | Duties | Department | Location | E-mail Address | Phone Number | Status |
|---|---|---|---|---|---|---|---|
| Doe, John | Engineer | Mechanical Design | Physical Engineering | Toronto | john.doe @nortel. com | 555-1222 | Absent |
| Doe, Jane | Engineer | Electrical Design | Circuit Engineering | Ottawa | jane.doe @nortel. com | 555-1234 | Present/ busy |
| Wayne, John | Sales | Meridian System Sales | Marketing | Toronto | j.wayne @nortel. com | 555-9876 | Present/ available |
| Williams, Frank | Sales Manager | Meridian System Sales | Marketing | Toronto | f.williams @nortel. com | 555-9999 | Present/ available |

FIG. 7

| Product ID | Plant | Plant Location | Plant Manager | Product Manager | Inventory (Units) | Plant Capacity Available (Units/week) |
|---|---|---|---|---|---|---|
| Meridian | PL1 | Brampton | Jane Doe | John Doe | 540 | 2 |
| Symposium | PL1 | Brampton | Jane Doe | Sam Smith | 102 | 4 |

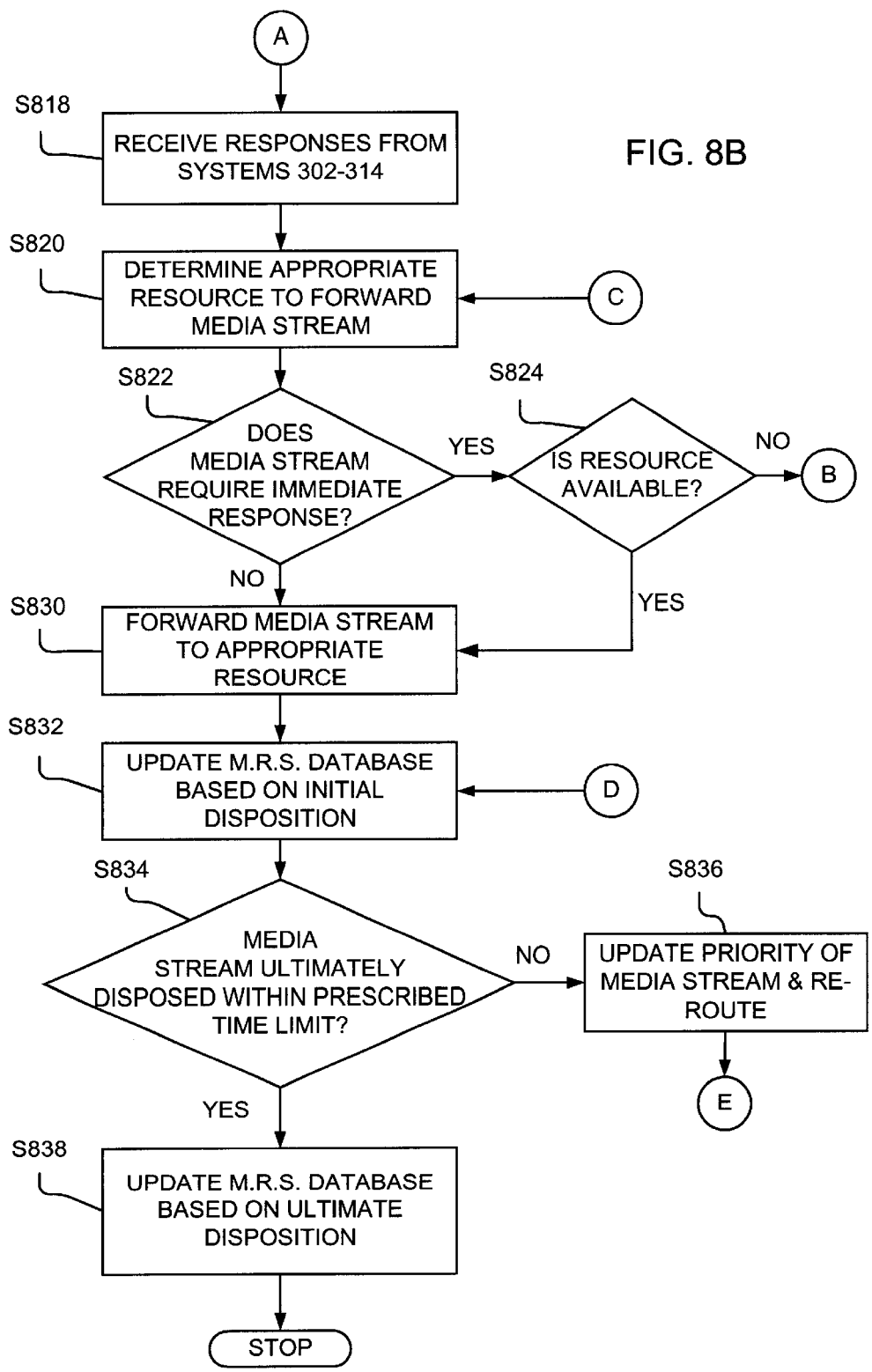

WORKFLOW MANAGER

FIELD OF THE INVENTION

A system and method for handling a variety of media streams are disclosed. More particularly, a system and method are disclosed that can provide enterprise-wide routing and, preferably, reporting for a variety of incoming media streams.

BACKGROUND TO THE INVENTION

Telephone call centers are known in the art. A call center is used in allocating telephone calls received from the Public Switched Telephone Network (PSTN) to be processed by a plurality of call handling personnel or agents. Call centers are used to route telephone calls requiring specific services—such as information in a particular language or information about a product—to an agent capable of providing these services. Calls are routed to a particular agent by comparing the services required by the call, determined by, for example, the originating call information, the number called, menu selections made by the caller, and the priority of the call, with the resources available to process the call at the call center, such as personnel, and the skill sets associated with those personnel.

As calls arrive at the call center, computerized call center equipment routes incoming calls of a particular call type, that is, those calls that require identical services, in queues and allocates these calls to appropriate agents, who have the skill set necessary to process these calls in the queues. As will be appreciated, an agent may be assigned to more than one queue.

The calls that are processed by the call center are also tracked by call center equipment. This tracking provides detailed reporting statistics on the disposition of each call received by the call center.

The ability to process calls by a call center is limited by the number of agents that can be accommodated by the call center equipment. Moreover, the skill sets of the call personnel are often insufficient to satisfactorily dispose of all the calls received by the call center. For instance, a call received by a call center designed to attend to calls regarding catalogue sales would have difficulty in attending to a matter that is more appropriately handled by a company's legal department. Furthermore, as will be appreciated, the cost of providing the equipment and personnel to handle all calls that may be directed to an enterprise (e.g., a company) is not economically feasible with call center technology.

Further, a call center attends only to voice telephone calls from the PSTN. However, businesses receive more than just voice calls directed to the business in general. These other media streams, including for example, voice over IP, faxes, electronic mail ("e-mail"), web forms and video, are not processed in a formalized manner but rather on an ad hoc basis. Furthermore, the processing of these other media streams, due to the ad hoc nature of their processing, does not provide the same statistical processing information that enables a business to analyse and improve its response to customer inquiries. The current ad hoc methods and systems for attending to media streams, other than conventional telephone calls, currently require management control over numerous disparate systems. Moreover, these disparate systems do not provide a business with a unified interactive user interface.

Accordingly, it is desired to provide a method and system that can provide enterprise-wide routing and reporting upon a plurality of media streams that addresses these shortcomings of known call centers.

SUMMARY OF THE INVENTION

A workflow manager (also referred to herein as a media response system) monitors all media streams incoming to an enterprise, such as voice calls, e-mail, and fax. Through analysis of an incoming media stream, the manager develops attribute data for the stream. Based on the attribute data, the manager queries other systems in the enterprise for further information which will include candidate resources to handle the incoming stream. Based on the replies, the incoming stream is routed to a selected resource.

According to one aspect of the invention, there is provided a method for routing an incoming media stream comprising: a) receiving a media stream comprised of one of a plurality of media stream types directed to an enterprise; b) determining attribute data characteristic of said media stream from said media stream; c) based on said attribute data, requesting information from databases available in said enterprise; and d) based on responses to said information requesting step, routing said incoming media stream to a resource destination address associated with said enterprise.

The invention also provides a system and computer program product to effect this method.

BRIEF DESCRIPTION OF THE DRAWINGS

The present invention will be more clearly understood after reference to the following detailed specification read in conjunction with the drawings which illustrate example embodiments of the invention wherein:

FIG. 6 is data exemplary of a portion of FIG. 4;

FIG. 7 is data exemplary of a second portion of FIG. 4; and

FIGS. 8A, 8B and 8C are flow charts illustrating a portion of the software control of the system of FIG. 1.

DETAILED DESCRIPTION OF THE PREFERRED EMBODIMENT

Figure 1:
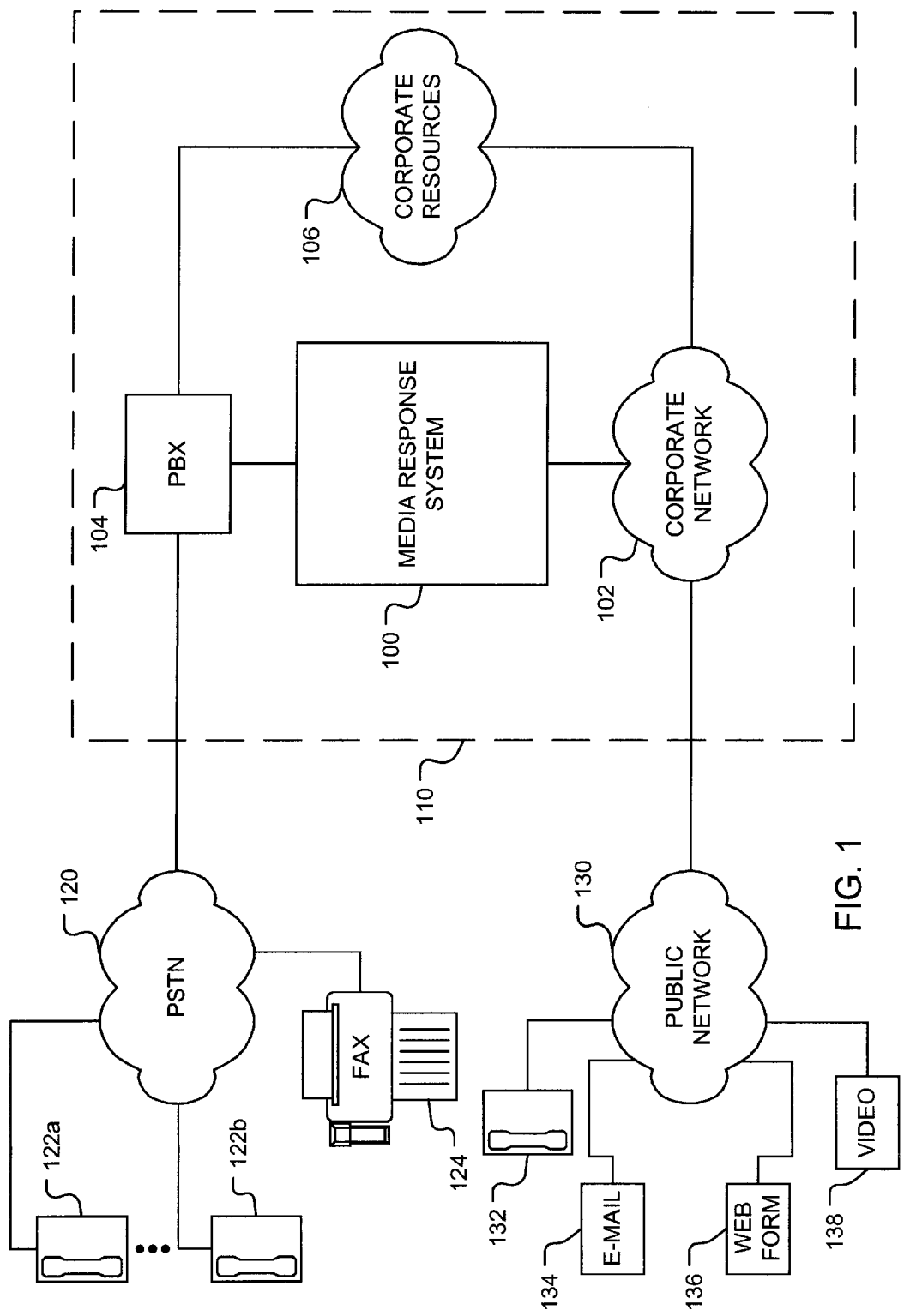
FIG. 1 is schematic of an enterprise including a media response center, exemplary of a preferred embodiment of the present invention.

A workflow manager, or media response system ("MRS"), exemplary of the invention and designated 100, is shown in FIG. 1. MRS 100 is interconnected to corporate network 102 and PBX 104. Corporate network 102 and PBX 104 are also in communication with corporate resources 106. Together MRS 100, corporate network 102, PBX 104 and resources 106 form enterprise 110. Enterprise 110 represents a non-physical entity. That is, enterprise 110, could be, for example, a multi-national corporation with corporate resources and physical locations located world wide. Moreover, corporate resource 106 can comprise entities that are located outside the physical locations associated with enterprise 110.

PBX 104 may be a conventional Nortel™ Meridian™ PBX or other suitable Private Branch Exchange device for communication with PSTN 120. PBX 104 could alternatively be replaced by another suitable telephony switch which could form part of PSTN 120.

PBX 104 is in communication with PSTN 120. Connected to PSTN 120 is a plurality of devices such as telephone stations 122a and 122b (generally 122) and fax machine 124. Telephone stations 122 need not be wired directly to PSTN 120 but may also be wireless devices connected indirectly to PSTN 120. Moreover, other devices may communicate with enterprise 110 via PSTN 120 such as computers, video calls and the like.

Corporate network 102 is also in communication with public network 130. Public network 130 may be the public internet, a data network of the same or another entity, or the like. In communication with public network 130 is a telephone station 132 for transmitting voice over IP, e-mail application 134, web browser 136 and video conferencing application 138. Other applications used for sending messages over a data network, such as public network 130, may also be used.

Figure 2:
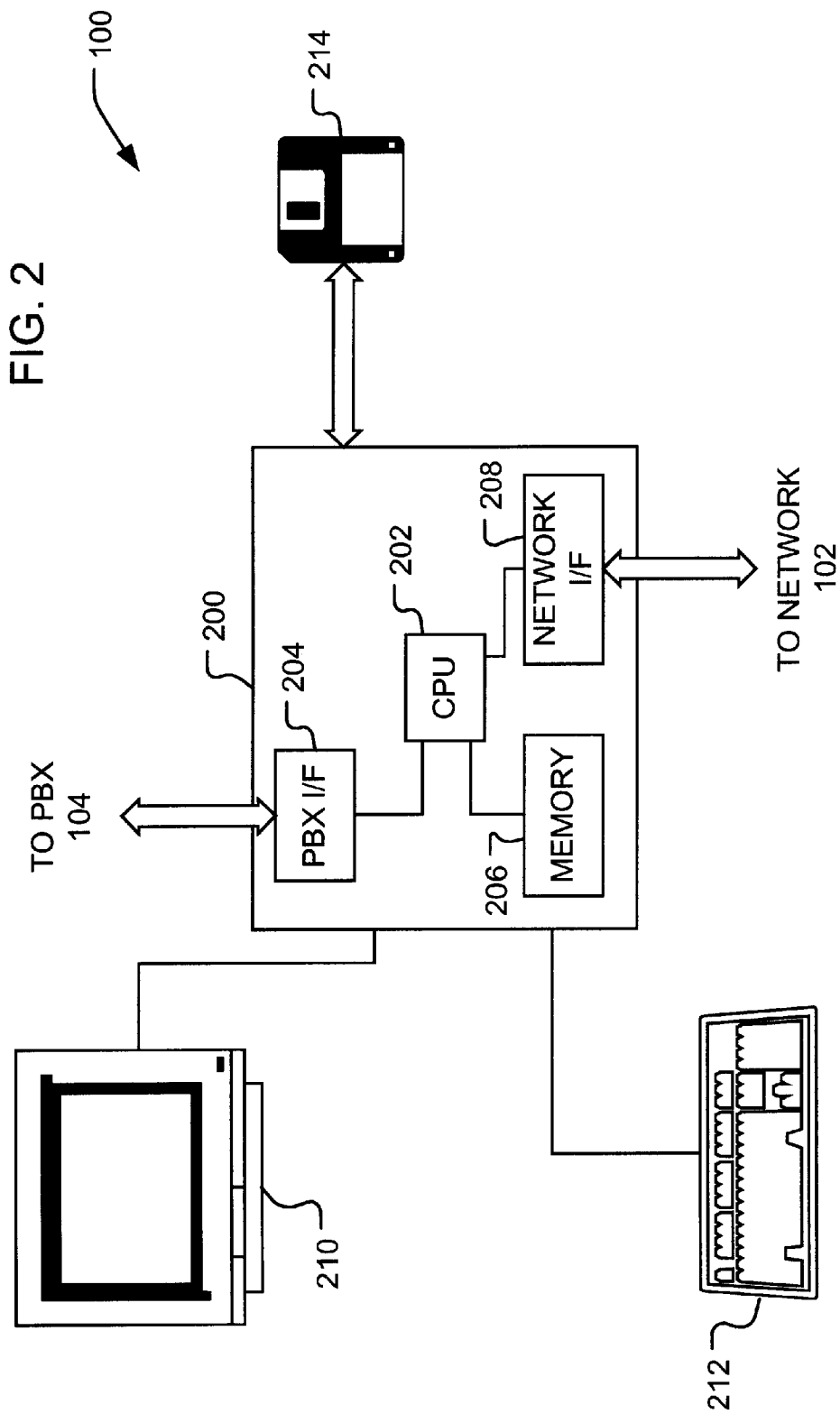
FIG. 2 is a schematic detail of a portion of FIG. 1.

FIG. 2 illustrates MRS 100 in greater detail. MRS 100 includes computing device 200. Computing device 200 is comprised of processor 202 in communication with each of PBX interface 204, persistent memory 206 and network interface 208. Computing device 200 may also be able to read data and programs from computer readable medium 214 for transfer to memory 206. As illustrated, computer readable medium is a removable disk. However, it could equally comprise a removable tape or chip. Also, the computer readable medium could comprise a memory of a remote computer provided there were an appropriate interconnection between computing devices 200 and the remote computer, such as an internet connection. Also, optionally connected to computer 200 is display 210 and input device 212. Display 210 may be any known display device such as a monitor or LCD screen. Similarly input device 212 may include one or more of a mouse, keyboard, microphone or other suitable input device.

Processor 202 is a conventional central processing unit such as a processor from the Intel™ family of x86 processors. In the alternative, processor 202 could be Reduced Instruction Set Computer (RISC), such a Sun™ UltraSparc™ or a Motorola™ PowerPC™ or any other suitable processor capable of adapting processor 202 and computing device 200 to perform the functions of MRS 100. PBX interface 204, which is in communication with PBX 104 (FIG. 1), is any suitable interface capable of sending and receiving data to and from PBX 104 (FIG. 1) and can include an ethernet interface card or an RS-232 serial port. Memory 206 is any suitable combination of Random Access Memory ("RAM"), Read Only Memory ("ROM"), magnetic or optical storage media such as hard disk drives. Network interface 208, which is in communication with corporate network 102 (FIG. 1), can be any suitable interface known by those in the art for communicating with a data network. Network interface 206 may be an ethernet, token ring, Asynchronous Transfer Mode ("ATM") or Integrated Services Digital Network ("ISDN") card. As will be appreciated by those skilled in the art, while PBX interface 204 and network interface 208 have been illustrated as consisting of two separate elements, the functions performed by these interfaces may be performed by a single device.

Figure 3:
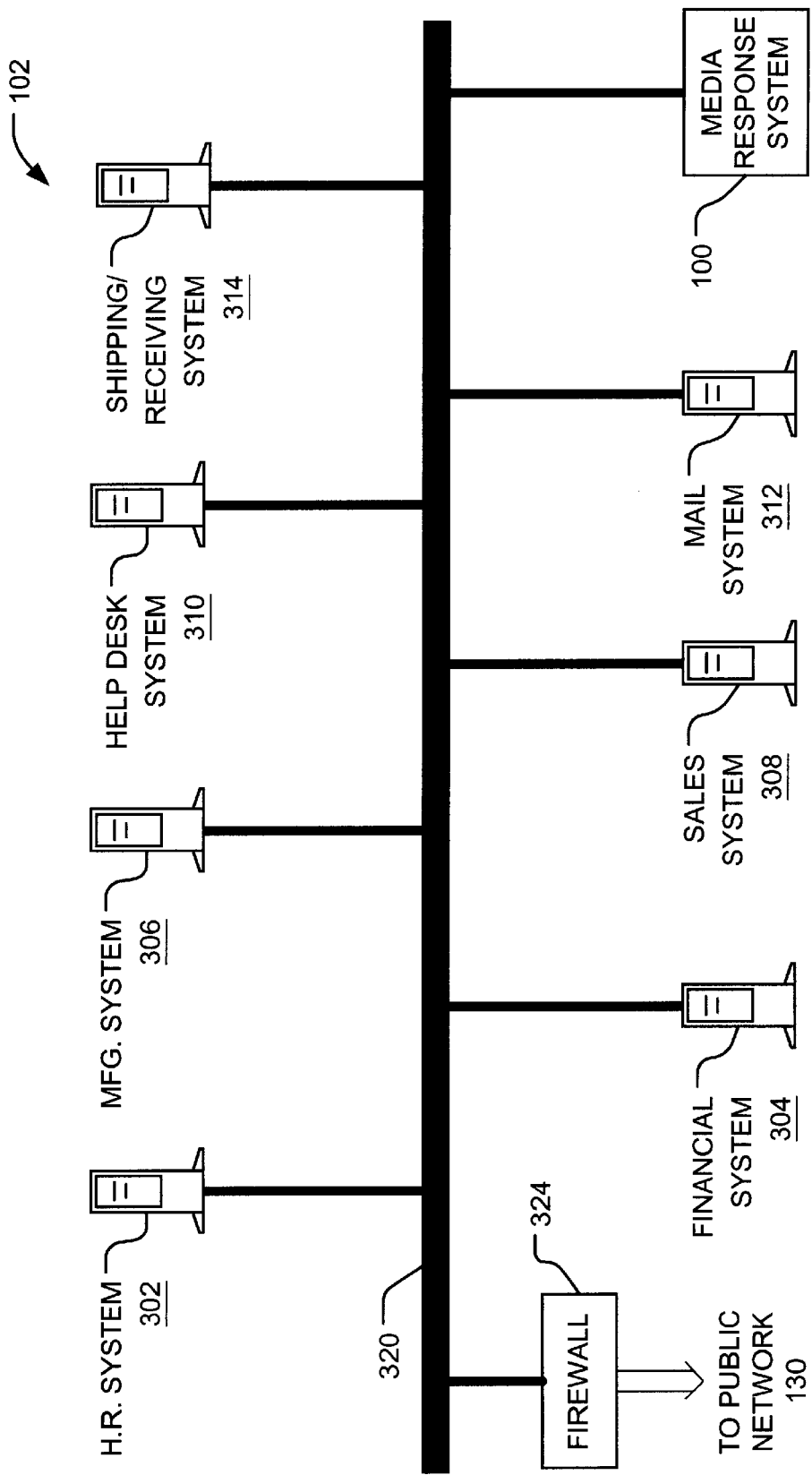
FIG. 3 is a schematic detail of a second portion of FIG. 1.

Illustrated in greater detail in FIG. 3 is corporate network 102. Corporate network 102 is comprised of the individual systems that typically are present in a corporate enterprise. Connecting to a network backbone 320 is Human Resources ("H.R.") system 302; financial system 304; manufacturing system 306; sales system 308; help desk system 310; e-mail system 312; shipping and receiving system 314; and MRS 100. While shown to be in communication with each of the other systems, systems 302–314 need not be in communication with all the other systems. However, at least some, and preferably as many as possible of these systems, should be in communication with MRS 100 either directly or indirectly, through the corporate network backbone. The backbone 320 also has a connection 322 to the public network 130 (FIG. 1) through fire wall 324. While backbone 320 is shown in a bus configuration, a star, ring or other suitable topography may be used. Backbone 320 could be any suitable physical network such as, for example, co-axial cable or fiber optic cable. Similarly, the network protocol could be any suitable form of data communication such as ethernet, token ring, ATM or the like.

Systems 302–314 of corporate network 102 are only illustrative of the types of systems that may be present in an enterprise environment. Each of systems 302–314 is comprised of a hardware and a software element. The hardware elements for systems 302–314 may be proprietary or combination of known hardware systems comprising one or more of mainframe computers, such as an IBM™ ES9000™; minicomputers, such as a Digital Equipment Corporation VAX™ machine; or network servers such as a Sun™ UltraSparc™ station or IBM™ Netfinity™ servers. The software components of systems 302–314 could also be comprised of a combination of proprietary and commercially available software tailored to the particular enterprise. For example, H.R. system 302 could, for example, be representative of a system that uses PeopleSoft™ software. Financial system 304 could be using Oracle™ software. Manufacturing system 306 could for example be a combination of software available from Baan™ or SAP™ corporations. Help desk system could, for example, be implemented with Remedy™, Clarify™, Sisbel/Scopus™, or Vantive™ software. Mail system 312 may be provided through Microsoft™ Exchange™. Similarly shipping and receiving system 314 could be implemented with Baan™, SAP™, or PeopleSoft™ software.

Figure 4:
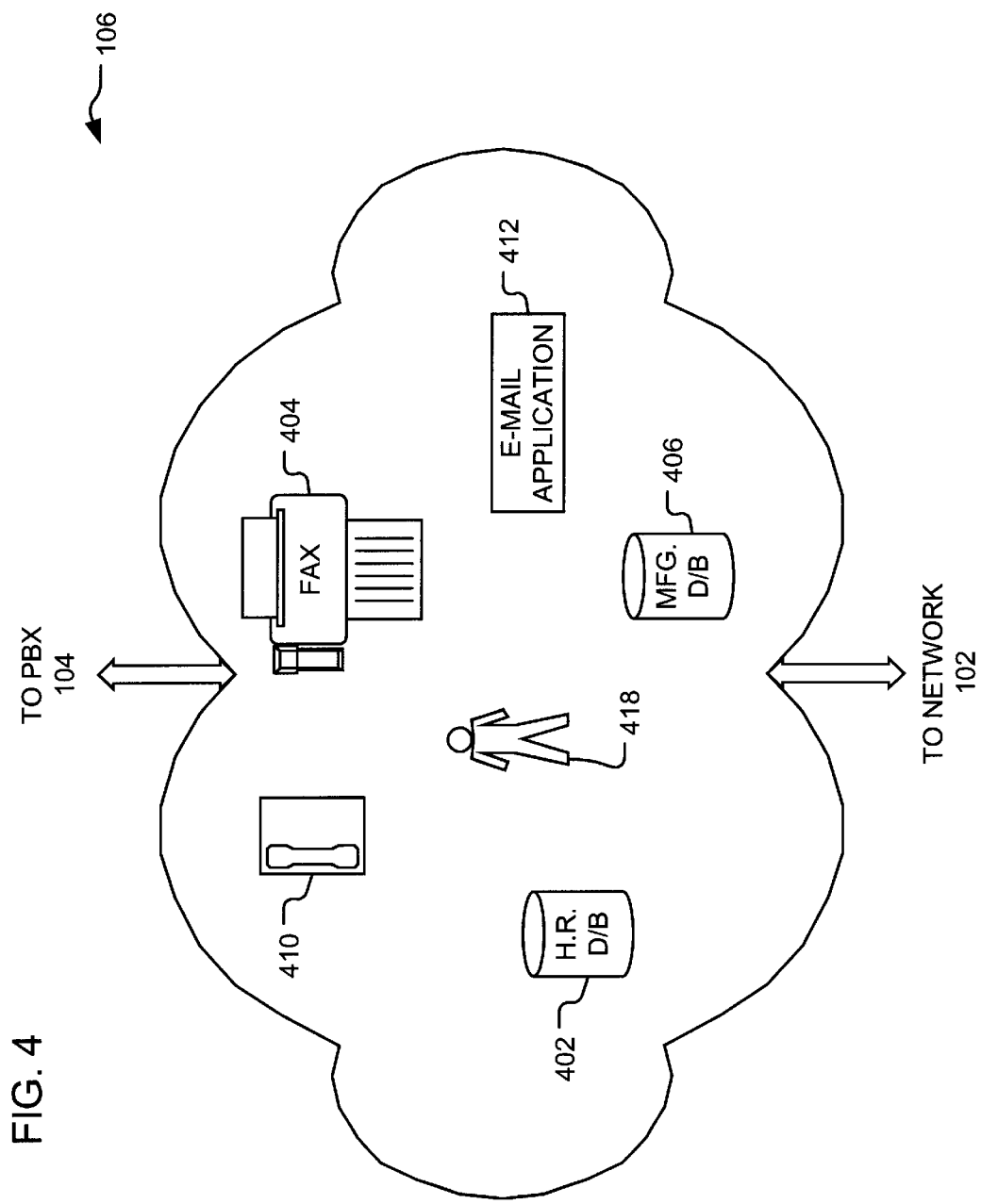
FIG. 4 is a schematic detail of a third portion of FIG. 1.

FIG. 4 details corporate resources 106. Corporate resources 106 are any of the physical, informational or biological elements of enterprise 110 (FIG. 1). These corporate resources may be used by one or more of the other constituents of the enterprise. Examples of physical elements that comprise corporate resources shown in FIG. 4 are telephone handset 410, which could be connected to PBX 104 (FIG. 1), and fax machine 404. Fax machine 404 may also be connected to PBX 104, corporate network 102 (FIG. 1) or form part of computing device 200 (FIG. 2). Also forming part of corporate resources 106 are all of the personnel of enterprise 110. Unlike call centers where only a portion of the enterprise personnel, namely the call center agents, are available to the call center system to process an incoming call, the disclosed invention may have at its disposal all or any sub-set of the personnel of enterprise 110 (FIG. 1). The informational resources of corporate resources 106 may include the databases generated and accessed by systems 302–314 of corporate network 102 (FIG. 3). These informational resources may include, for example, H.R. database 402 generated and accessed by H.R. system 302 (FIG. 3) or manufacturing database 406, which is generated and accessed by manufacturing system 306 (FIG. 3). Also forming part of the informational resources of corporate resources 106 are the programs and applications available on systems 302–314. This may include, for example, e-mail application 412 that is running on mail system 312 (FIG. 3).

The foregoing corporate resources are merely exemplary and a person skilled in the art would understand that other resources are available and suitable for use in the operation of MRS 100.

Figure 5:
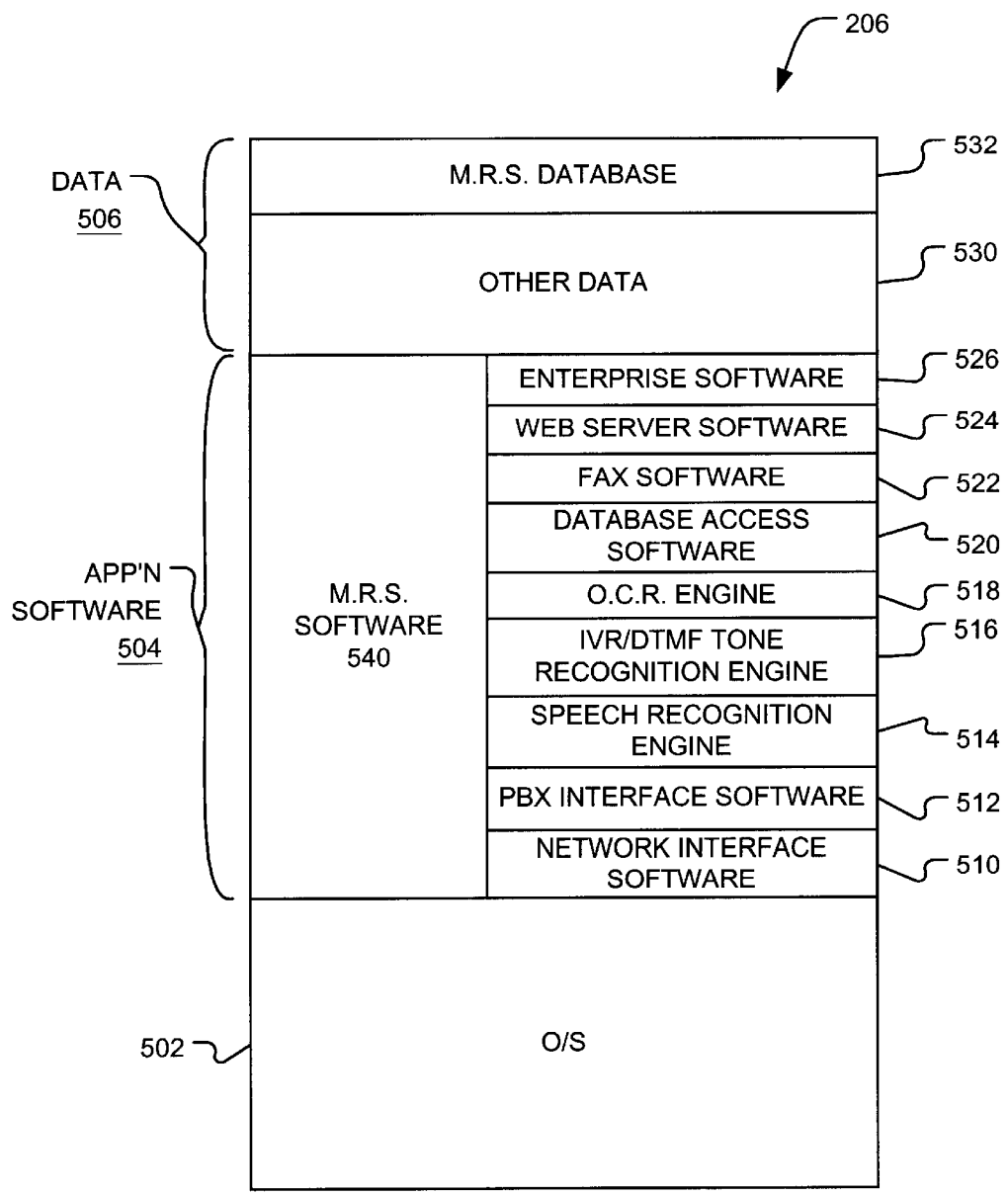
FIG. 5 is a schematic detail of a portion of FIG. 2.

FIG. 5 schematically illustrates memory 206 of computing device 200 (FIG. 2). Memory 206 is comprised of three portions namely operating system 502, application software 504 and data 506. Operating system 502 is any suitable operating system capable of adapting computing device 200 into MRS 100 (FIGS. 1 and 2), such as, for example, Microsoft™ Windows™ 95, 98 or NT™, Sun™ ™ Solaris™ or an embodiment of Unix. Application software 504 comprises network interface software 510; PBX interface software 512; speech recognition engine 514; Interactive Voice Response ("IVR") system 516, which includes a DTMF tone recognition engine; optical character recognition ("OCR") engine 518; database access software 520; fax software 522; web server software 524; and enterprise software 526; all of which are in communication with media response system software 540. Data 506 comprises the work space and miscellaneous storage area necessary for the operation of MRS 100, as understood by those skilled in the art, designated 530. Data 506 is also comprised of MRS database 532.

Network interface software 510 includes a communication suite for communicating with corporate network 102 (FIG. 1) and may include, for example, protocols for Internet Protocol ("IP"), Serial Link Internet Protocol ("SLIP"), and Point to Point Protocol ("PPP"). Network interface software 510 also includes software necessary to transmit data via network interface 208.

PBX interface software 512 includes a communication suite for communication with PBX 104 via PBX interface 204 (FIGS. 1 and 2). Suitable PBX interface software 512 is embodied in, for example, the Symposium™ Call Center Server of Nortel Technologies.

Speech recognition engine 514 provides functionality to convert received speech into computer recognizable code. Speech recognition software 514, such as that available from Dragon Systems of Massachusetts, or OpenSpeech™ of Nortel Technologies, adapts processor 202 (FIG. 2) to enable conversion of a digitally encoded speech signal received by MRS 100 over public network 130 or PSTN 120, via PBX 104, into computer recognisable code (FIG. 1). Speech recognition software may also utilize a digital signal processor (not shown), in communication with processor 202, to more efficiently process digital speech signals.

IVR system 516 suitably operates to recognize DTMF tones that may be transmitted to MRS 100. An example of IVR system 516 is Symposium™ IVR and Meridian™ IVR, both of Nortel Technologies. Referencing FIG. 1 along with FIG. 5, IVR system 516 enables MRS 100 to recognize and interpret keypad entries received from telephone stations 122 or 132 sent via PSTN 120 or public network 130, respectively, that may be received from users desiring contact with enterprise 110. These keypad entries are converted into computer recognizable code and, in concert with the operations of MRS software 540, are used to route an incoming media stream to a responsive destination. In an alternative embodiment, IVR system 516 forms part of corporate resources 106 that is accessible by MRS 100.

OCR engine 518, such as InText from Xerox Corporation, or other suitable software known to those skilled in the art, recognizes and converts graphical images that include alphanumeric characters into an electronically readable form. For instance, a fax received by MRS 100, through fax software 522, will be received in a graphical format, such as, for example, a TIF or GIF formatted file. A graphical image of this sort does not provide any useable data that can assist in routing the fax to a responsive destination within enterprise 110 (FIG. 1). However, by converting the received fax into a more suitable form, such as, for example an ASCII or RTF file by operation of OCR engine 518, information may be gleaned from this form of the received fax to properly route the fax through enterprise 110.

Database access software 520 enables MRS software 540 to query and receive responses to those queries from exemplary databases 402 and 406, as well as those databases associated with systems 304 and 308–314. If, for example, exemplary databases 402 and 406 (FIG. 4) have been generated and are accessible through Oracle™ software, then database access software 520 would receive requests generated by MRS software 540 and convert these requests into queries accepted by the Oracle™ software. Database access software 520 may, in the alternative be an ODBC software layer or other similarly suitable database access software program. In such, an instance databases 402 and 406 should be ODBC compliant.

Fax software 522, in concert with PBX interface software 512 and network interface software 510 receives faxes sent to enterprise 110, over PSTN 120 and public network 130 (FIG. 1). Fax software 522 enables MRS software 540 to receive and route an incoming fax to a destination within enterprise 110, in co-operation with network interface software 510 and corporate network 102 (FIG. 1). Fax software 522 may also receive fax responses to these incoming faxes, which responses originate from within enterprise 110. Such "in-house" faxes are then routed and transmitted by fax software 522 to a requested destination via public network 130 or PSTN 120. Should an in-house fax be destined for an address identifying a location associated with public network 130, the in-house fax will, in conjunction with the operation of network interface software 510, be transmitted over corporate network 102 and then routed to public network 130. However, should the in-house fax be destined for an address, or destination number ("DN"), associated with PSTN 120, the in-house fax may be transmitted to PSTN 120 through the operation of PBX 104 and PBX interface software 512. Alternatively, a PSTN-destined fax may be sent to PSTN 120 by transmitting the in-house fax to fax machine 404 (FIG. 4) over corporate network 102. In such a case, fax machine 404 would be directly connected to PSTN 120, rather than connecting indirectly through PBX 104. In an alternative embodiment, fax software 522 forms part of corporate resources 106 rather than part of MRS 100. In this embodiment fax software 522 would be available for use by MRS software 540 over corporate network 102.

Web server software 524, such as, for example, Microsoft™ IIS or Apache™ server software, accepts incoming media streams transmitted to enterprise 110 from the world wide web portion of public network 130 (FIG. 1). For example, a customer of enterprise 110 may make a request through a web-based form situated on the web site of enterprise 110. Receipt of the data contained in said form by web server software 524 will be relayed to MRS software 540 for routing and tracking. Similarly, a request may be made to commence a "chat" session, or a voice over IP ("VoIP") connection over the world wide web. Such requests are received, via public and corporate networks 130 and 102, respectively, and, in conjunction with the operation of network interface software 510, interpreted and relayed to MRS software 540 by web server software 524. As will be appreciated by those skilled in the art, web server software 524 need not form part of MRS 100 but could, in an alternative embodiment, be part of a separate system that is in communication with MRS 100, through, for example, backbone 320.

Enterprise software 526 represents other software that is available for use by MRS software 540. As disclosed above, part of the exemplary corporate resources 106 is e-mail application 412 (FIG. 4). E-mail application 412 would contain address lists corresponding to the e-mail addresses of the personnel of enterprise 110. Moreover, MRS software 540 can use the facilities of e-mail application 412 to route an incoming media stream to personnel connected to mail system 312 via e-mail application 412. Enterprise software 526 could also include scheduling software, such as Microsoft™ SchedulePlus and such as is embodied in PeopleSoft™, Baan™, and SAP™ to determine the availability of personnel. For instance, accessing enterprise software 526 by MRS software 540 may assist in determining which personnel are on holidays. Other software that may comprise part of enterprise software 526 is facility access software, such as is produced by Honeywell, to determine whether a particular employee is on-site by accessing the logs of the facility access software. As those skilled in the art will appreciate, enterprise software 526 can include a wide variety of software applications and databases.

MRS database 532 also stores business rules for the querying of systems 302–314 and for analysing the responses to these queries. The business rules of MRS database 532 are designed to reflect the business environment of enterprise 110 (FIG. 1). The business rules of MRS database 532 are used by MRS software 540 to analyse the data of the incoming media stream and formulate queries to determine the appropriate routing of the incoming media stream. Moreover, upon receipt of the responses to these queries, the business rules are used by MRS software 540 to analyse the responses to assess the information and rank possible destinations for the incoming media stream.

Figure 5A:
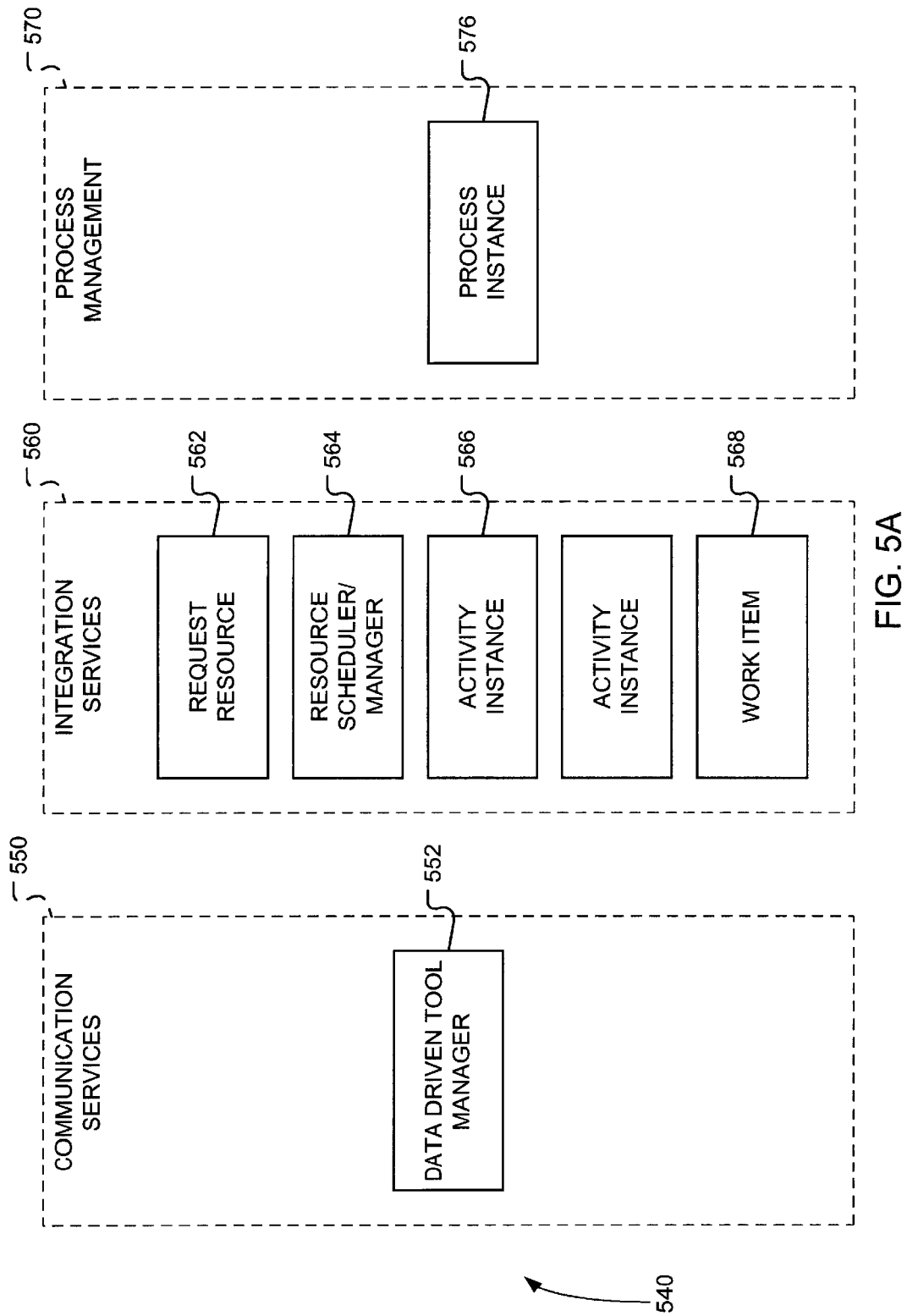
FIG. 5a is a functional block diagram for a portion of FIG. 5.

MRS software 540, when operating with MRS database 532, creates the agents illustrated in FIG. 5a. Turning to FIG. 5a, the operating MRS software comprises communication services 550, integration services 560, and process management 570. The communication services 550 comprises a data driven tool manager 552. The integration services 560 comprises resource requests 562, a scheduler/resource manager 564, activity instances 566, and work items 568. The process management 570 comprises process instances 576.

While in the illustrated embodiment, application software 504 is stored in memory 206 of computing device 200 (FIG. 2), alternatively, computing device 200 may be connected to a number of servers which may store this application software. For example, a fax server will have an OCR engine and an interactive voice response (IVR) server will have a speech recognition engine and a DTMF tone recognizer. In such case, in operation, computing device 200 will work in concert with these other servers.

In overview, MRS software 540 provides for the routing of media streams incoming to enterprise 110, and may track the responses thereto. In addition to requesting services and receiving data provided by software 510–524, MRS software 540 monitors incoming requests made by customers of enterprise 110, and upon receipt of a request, regardless of media type (such as fax, e-mail, web based form, chat session request, video conference, VoIP connection request), analyses the media type, the media's associated address data (e-mail header, ANI, DNIS, etc.) and any content data that is associated with the media stream. The content data is analysed by searching the incoming media stream's text (if the incoming media stream is an e-mail or a fax, conversion to a suitable format by OCR engine 518 would be first required), speech (if an incoming media stream is a video conference or VoIP connection, operation of speech recognition engine 514 would be required) and/or keypad entries (following an IVR session). Attribute data characterizing the incoming media stream is thus generated by MRS software 540 and used in routing incoming media to a resource destination within corporate resource 106 within enterprise 110. In sum, the media stream's type, address information and content information forms attribute data that will, in part, determine the resource destination address for routing of the media stream within enterprise 110. It should be noted that not all of these pieces of information may be necessary for sufficient attribute data to be formed by MRS software 540 for routing. Indeed, for some media, not all of these pieces of information will be available.

A resource destination is defined as any address or identifier that can be used by MRS 100 for routing an incoming media stream to a resource within enterprise 110. A resource destination address may include a DN, an e-mail address, an identifier for a corporate resource, such as, for example, video conferencing facilities, a page number, a cellular phone number, an identifer for a fax machine, or any other similar suitable identifier that can be used to route an incoming media stream to a corporate resource 106. Routing is effected by transmitting the incoming media stream to a corporate resource 106 via PBX 104 or corporate network 102. A resource destination address, such as a DN, corresponds and identifies resource destination, such as, for example, the telephone handset corresponding to the DN.

Upon initially disposing of the incoming media stream to a corporate resource 106, MRS software 540 stores data corresponding to this disposition in MRS database 532. MRS software 540 also monitors the ultimate disposition of the media stream and also stores the corresponding statistics in MRS database 532.

FIGS. 6 and 7 illustrate exemplary entries that may form part of H.R. database 402 and manufacturing database 406 (FIG. 4), respectively. Although shown as a relational database, with columns 602–614 for H.R. database 402 and columns 702–714 for manufacturing database 406, databases 402 and 406 may be organized in any fashion known in the art such as, for example, an object oriented database.

FIG. 6 illustrates the fields and entries that may be present in an enterprise H.R. database 402. H.R. database 402 is formed of column entries for an employee's name 602; an associated title 604; employee duties 606; the employee's department 608, the location of the employee 610; the employee's internal e-mail address 612; and the employee's phone number 614. Additionally, the H.R. database may include a column 616 indicating the status of each employee, that is, whether the employee is present or absent and, if present, whether busy or available. For those employees who are part of a call center, this information is dynamically tracked by the call center. For other employees, present or absent information may be uploaded to the H.R. database from a facility access database or from a software calendar of the employee. A software calender may also provide information as to whether the employee is busy or available. Exemplary entries, representing four employees, are illustrated as data rows 620a, 620b, 620c and 620d.

FIG. 7 illustrates manufacturing database 406 which contains data relating to manufacturing operations. Database 406 is comprised a columns relating to a product name or ID 702; the product manufacturing plant ID 704; plant location 706; plant manager 708; product manager 710; the plant's inventory 712; and the available plant capacity for the product 714. Data entry rows 720a and 720b are illustrative of data that may be entered into columns 702–714 of manufacturing database 406.

Figure 8A:
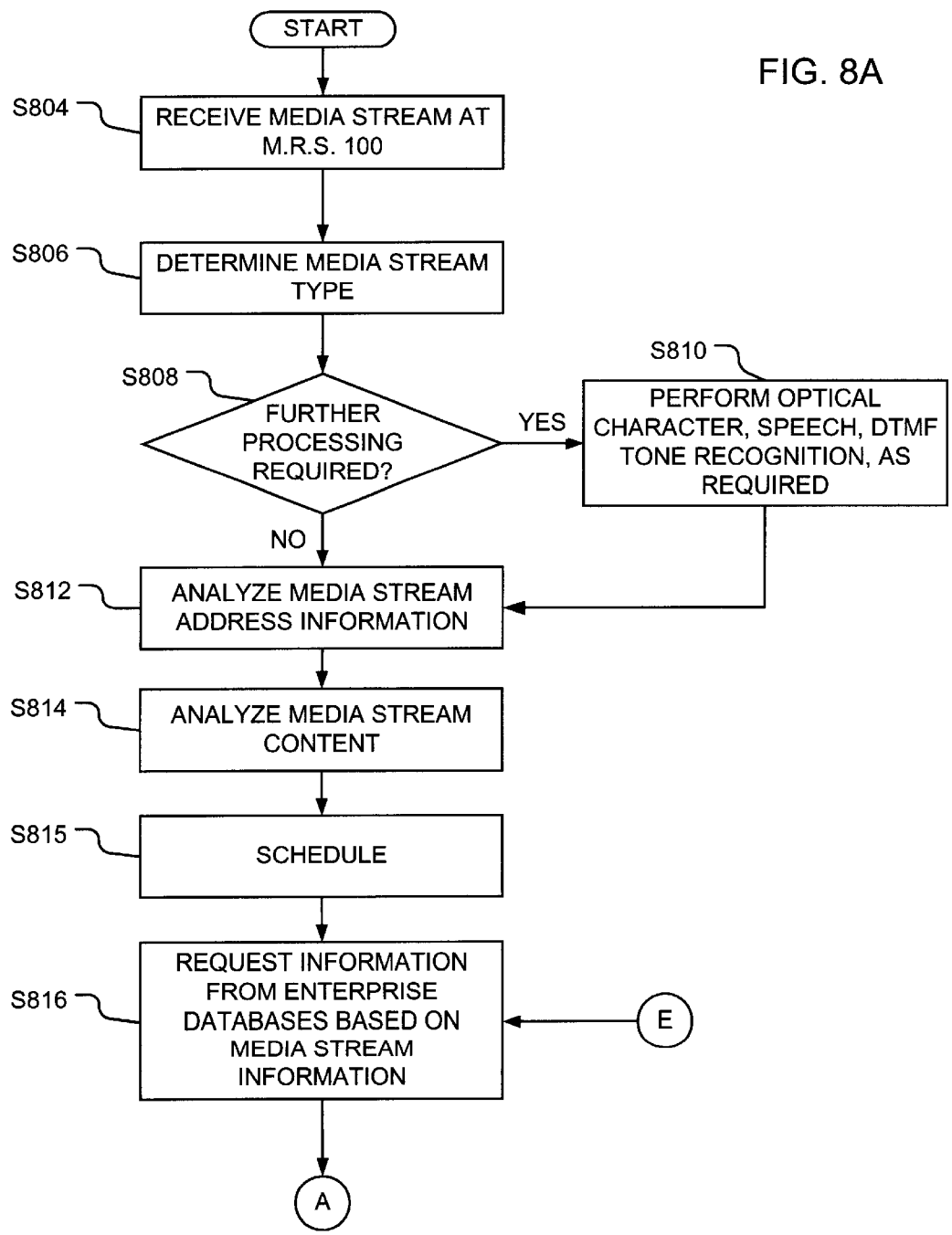
Figure 8C:
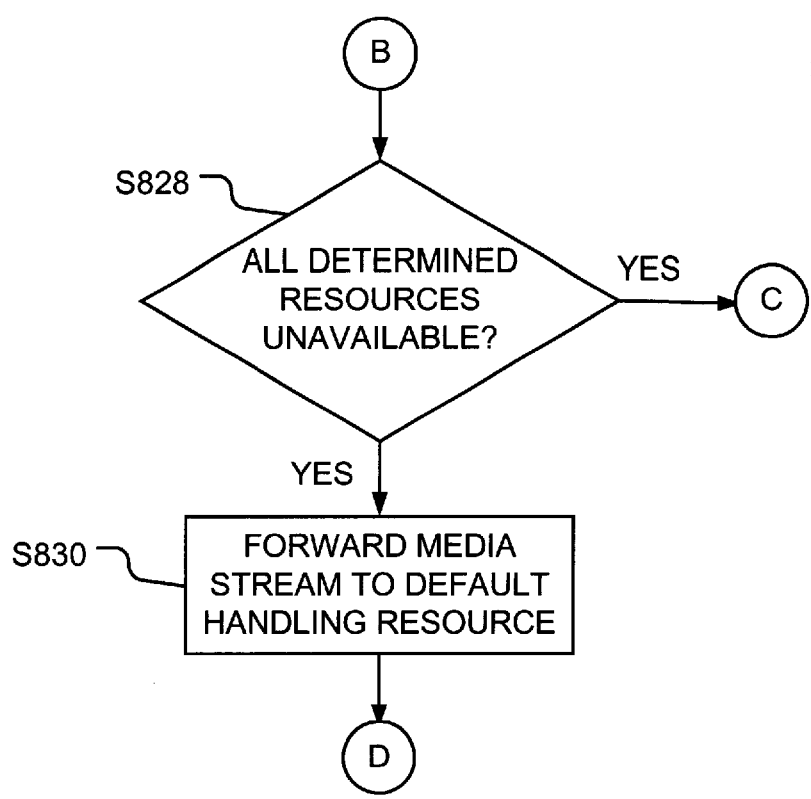

Referencing all figures but focussing on the flowcharts of FIGS. 8A, 8B and 8C which illustrate operations of MRS 100, an incoming media stream is received by enterprise 110 via one of PSTN 120 and public network 130. This media stream is directed by PBX 104 or corporate network 102 to MRS 100 where it is monitored and responded to by MRS software 540 (S804). If the media stream was received by MRS 100 from PBX 104 and if, for example, the media stream was a fax sent via PSTN 120, MRS software 540 will have received the media stream through operation of PBX interface software 512. In contrast, had the media stream been directed to enterprise 110 via public network 130, such as when the media stream is an e-mail message, the media stream is directed to MRS 100 via the e-mail system 312 of corporate network 102 where it is operated on by MRS software 540 after delivery by operation of network interface software 510.

Upon receipt of the media stream by MRS 100, MRS software 540 creates a resource request 562 (FIG. 5a) which determines the media stream's type (i.e. e-mail, fax, web based form, VoIP, etc.) (S806). If the media stream type permits immediate analysis (S808), that is the media stream is not a digital representation of an analog signal such as VoIP or fax, MRS software can analyse the media stream for routing purposes. On the other hand, if the media stream is of a type where further processing is required prior to analysis, MRS software 540 will request further processing from other applications in software 504 (S810). For example, faxes received by system 100 directly, through operation of fax software 522 or transmitted to MRS 100 over corporate network 102, if fax software 522 forms part of corporate resources 106, may require conversion by OCR engine 518. Similarly, VoIP or PSTN calls would likely require an interactive session with the caller employing speech or DTMF tone recognition, by operation of speech recognition engine 514 and the DTMF tone recognition engine of IVR system 516, in order for MRS software 540 to obtain data to perform the analysis required for proper routing of the incoming media stream.

Upon recognition of the type of an incoming media stream, MRS software analyses the media type's address and content data (S812, S814, respectively), and forms the attribute data characteristic of the media stream. Address data, as disclosed heretofore, may include an e-mail header, or ANI or DNIS information. Similarly, through co-operation with web server software 524, any media stream received through the world wide web may include information similar to that contained in an e-mail header in a web based form or as part of a cookie that has been gathered by web server software 524. Typical address information may include the sender's name, originating e-mail or IP address, called and calling telephone number and the like. Like the call centers known by those skilled in the art, address information will be used to determine, in part, the proper routing within enterprise 110 of the media stream. MRS 100 then analyses the content of the media stream for any recognizable content, keywords, keypad entries and the like (S814). For example, a call could be routed based on a keypad entry of a file number. Together, the media stream's type, address and content form part of the basis for determining the routing of the media stream. From this analysis, attribute data, which is obtained from all or some of the media stream's type, address information and content, is formed by MRS software 540.

The media attribute data is passed to the scheduler/resource manager 564 which decides whether the resource request should be processed immediately or may be scheduled for future execution. Normally, unless the system is overloaded, all resource requests are immediately processed. In an overload condition, requests based on voice calls are given priority over other media types in scheduling for execution (S815). The scheduler/resource manager 564 then either permits the resource request 562 to proceed or holds it dormant till a scheduled future time. Once the resource request proceeds, a process instance 576 is created which initiates one or more activities 566 based on a process definition template. An activity instance will query the scheduler/resource manager 564 for a resource that can satisfy the request.

Based on the resource query, the scheduler/resource manager 564 of MRS software 540 requests information from systems 302–314 (S816). For instance, if the media stream passed to MRS software is a fax, which has been passed through OCR engine 518, information that may be gathered from the fax, from the header information and the contents may include the calling number (gathered from the ANI), the topic from the subject line, and perhaps a product name, for example, the keywords "Meridian" and "Sales". The media type, address and content of the incoming media stream, in conjunction with business rules stored in MRS database 532 and forming part of MRS software 540, result in requests for further information being generated and transmitted to the various databases of enterprise 110, such as H.R. database 402 and manufacturing database 406. These requests will be generated by schedular/resource manager 564 which in turn are passed to database access software 520. Database access software 520 will then generate multiple queries which will be sent over corporate network 102 to systems 302–314.

Responses to the queries generated by database access software 520, are received by the appropriate activity instance 566 of MRS software 540 (S818). Based on the foregoing example of a received fax with keywords "Meridian" and "Sales", data rows 620c, 620d and 720a (FIGS. 6 and 7, respectively) may be returned as each of these rows have the identified key words in at least one of their field entries. The activity instance 566 then creates a work item 568 storing everything known about the activity. The work item 568 invokes the data driven tool 552 which determines an appropriate routing destination within enterprise 110 (FIG. 1) based on the data returned by systems 302–314 and the business rules which are part of the data driven tool and are stored in MRS database 532. In the foregoing example it may be determined that the fax may be appropriately disposed of by sending the fax by email as an attached message, via e-mail application 412 of mail system 312, to j.wayne@nortel.com (S820). Furthermore, as the example incoming media stream was a fax, which does not require a response in real or near-real time, the e-mail will, for example, be sent without any urgency or priority attachment (S822). As such, the e-mail message, with the attached fax, would be sent to the determined destination (S830). Statistics on the receipt of the fax, and its disposition by John Wayne will be stored in MRS database 532 for future reporting requirements (S832).

In order to track ultimate disposition, the e-mail sent by MRS software 540 is preferably delivered with a request for acknowledgement. This may be accomplished, if supported by e-mail application 412, by sending the e-mail with an acknowledgement attachment. Such an attachment automatically notifies the sender, in this case MRS 100, upon the recipient, John Wayne, opening the message. The work item 568 associated with this resource allocation receives the acknowledgement. It then sends a done indication to the activity 566 which informs the process 576. The process in turn informs the request resource instance 562. The request resource instance 562 updates the MRS database 532 to record the ultimate disposition of the fax (S838) and then all instances 562, 576, 566, 568 associated with the resource allocation terminate. Had an acknowledgement regarding the ultimate disposition of the media stream not been received within a predetermined time limit (S834)—which time is based on the media stream's type, address and content, gathered in steps S806, S812 and S814, and the business rules stored in MRS database 532—MRS software 540 would perform any appropriate action such as updating the priority of the media stream and/or re-routing the media stream (S836). The media stream, in the foregoing example, could for instance be re-routed to the original destination, but with a different priority level attached to the e-mail message. In an alternative embodiment, the e-mail message could be re-routed to another destination based upon the original responses by systems 302–314 to the queries of MRS software 540, as determined in S820. Or, due to the dynamic nature of the databases of systems 302–314, a newly appropriate destination could be returned to MRS software 540 by systems 302–314 and the fax would be routed to this newly noted destination.

The database queries and responses and other messages sent through the enterprise may be sent using common object request broker architecture (CORBA), a known architecture which facilitates interfacing in a distributed environment.

It should be noted that the routing of the incoming media stream is not only dependent upon the media stream but also upon the availability of resources 106 within enterprise 110. MRS software 540 may be able to determine the availability of a resource directly from a database query, as illustrated in the personnel status column of the H.R. database of FIG. 6. Alternatively, where such a status column is not available, MRS software 540 may be able to determine the availability of corporate resources 106 in enterprise 110 in conjunction with network and PBX interface software 510 and 512, respectively, enterprise software 526 and the software associated with systems 302–314 (S824). For instance, MRS software 540 may determine the availability of personnel; whether said personnel are on currently on the phone —via inquiries made of PBX 104 (FIG. 1); the availability of video-conferencing facilities; as well as many other attributes regarding corporate resources 106.

If, rather than a fax, the incoming media stream represented a VoIP call, then a more immediate response is required to adequately and appropriately dispose of the media stream. The VoIP call may initially be passed to IVR system 516 where the user is presented with a number of options which can be selected by the appropriate keypad entries. If, for example, the entries selected by the user, and recognized by IVR system 516, represent a request for "Sales" information pertaining to the "Meridian" system, then MRS 540, in conjunction with database access software 520, would make the same queries of the H.R. and manufacturing databases. Again, the response to these queries would return data rows 620c, 620d and 720a. Based on the returned data (S818), MRS software 540, again in conjunction with the business rules stored in MRS database 532, determines that John Wayne is an acceptable recipient for the incoming VoIP call (S820). As the incoming media stream is a VoIP type, which requires immediate response (S822), MRS software 540 reviews the status information for John Wayne to determine he is present and available. MRS software 540, in co-operation with PBX interface software 512, may also query PBX 102 to determine if the identified resource, namely DN 555-9876 (the dial number associated with data row 620c, column 614) is currently available (S824). If PBX 102 responds to MRS software 540 that the requested number is in use, MRS software 540 returns to its first query responses, namely 620c, 620d and 720a, to determine if another suitable resource is appropriate resource is available (S828). If one is not, then MRS software 540 may then forward the VoIP call to a default handling system such as, for example, the voice mail box of J. Wayne by passing the call to PBX 102 (S830). However, MRS software 540 may determine, again based on the business rules stored in MRS database 532, that Frank Williams (data row 620d) is also a suitable resource to respond to the VoIP call (S820). Again PBX 102 may be queried to determine if the intended recipient's line is in use (S824), as the media stream's immediate requirement for response is unchanged (S822). Assuming that the intended line is not in use, the VoIP call would be transferred to 555-9999 via PBX 102 (S830). In either case, statistics on the receipt and initial disposition of the VoIP telephone call would be stored in MRS database 532 (S832). As will be understood by those skilled in the art, the destination of initial disposal of the incoming media stream need not be physically located within enterprise 110. As aforenoted, the corporate resource, in this example the DN 555-9999, could be wireless communication device, such as a cellular phone, that is carried by personnel to any location. Regardless of the physical location of destination resource, upon completion of the VoIP call, MRS software 540 would be notified by PBX 102 of this event and MRS database 532 would be further updated with statistics regarding the VoIP call's ultimate disposition (S838).

The MRS may subsume the functions of a conventional call center. Alternatively, where the enterprise 110 includes a call center associated with a PBX, the call center forms part of the MRS, as follows. Where a call arrives at the call center, it passes a routing query to MRS software 540. In the case where the call center is a SYMPOSIUM™ call center manufactured by Nortel Networks, such a query could be passed to the MRS software using the host data exchange (HDX) protocol. This query is handled by MRS software 540 in the manner described in conjunction with FIGS. 8A, 8B, 8C with the exception that step 804 comprises receiving the query rather than the media stream itself. Based on the query, the MRS software 540 determines an agent resource to handle the call and passes this back to the call center. However, unlike a conventional call center, if due to unforseen circumstances, an incoming call was not handled within the pre-determined time frame (S834), the conventional call could be re-routed from the call center to personnel outside of the call center but within enterprise 110 (FIG. 1) (S836).

If the incoming media is an e-mail or is a fax attached to e-mail, then, as noted, MRS 100 may monitor the reception of the media by the recipient to whom the media was directed by use of an acknowledgement receipt. Where the incoming media is voice over IP or a PSTN call which is not answered by the intended recipient but enters voice mail, MRS 100 may monitor reception of the media if the voice mail system is programmed to send the MRS a message identifying voice mail which has been picked up. The tasks of the MRS may be complete after determining that routed media has been picked-up. Alternatively, it may be desired for the MRS to determine whether the recipient has responded to the media. This could be accomplished by all media originating from the recipient passing through the MRS and being matched with any previously unanswered media which had been directed to that recipient.

The MRS may store information on the activities which occurred in handling an incoming media streams (e.g., which systems in the enterprise were queried and provided information and the ultimate disposition of the incoming media stream). This allows the formulation of statistics, such as costing statistics and turn around time for handling incoming media streams of varying types. The stored information and/or the statistics may be available to a system administrator in an historical database or may be automatically distributed dynamically or in batch form to selected destinations.

Those skilled in the art will understand and appreciate that the steps of the method disclosed in FIGS. 8A–8C need not be performed in the same sequence or in their entirety to fall within the spirit and scope of the invention. Moreover, those skilled in the art that the response to a media stream need not be formulated in the same media type as the incoming media stream. For example, an incoming fax may be responded to by telephone call, e-mail, fax, video conference or other types of media.

It will be further understood by the person skilled in the art that the distinction between operating system 502, application software 504 and data 506 (of FIG. 5) is artificial and is described in this form for clarity and ease of understanding. Moreover, application software 504 is also artificially separated into software components 510–540. It is well known to persons skilled in the art that several of these functions can and are embodied in a single software program and that several of these programs can be incorporated into operating system 502. As such, various combinations of software and a variety of demarcations between software packages that perform the operations described above are within the scope and spirit of this invention.

It will be further understood that the invention is not limited to the embodiments described herein which are merely illustrative of a preferred embodiment of carrying out the invention, and which are susceptible to modification of form, arrangement of parts, steps, details, and order of operation. The invention, rather, is intended to encompass all such modification with its spirit and scope, as defined by the claims.

What is claimed is:

1. A method for routing an incoming media stream comprising:
   (a) receiving a media stream comprised of one of a plurality of media stream types directed to an enterprise;
   (b) determining attribute data characteristic of said media stream from said media stream;
   (c) based on said attribute data, requesting information from one or more databases available in said enterprise; and
   (d) based on responses to said information requesting step, routing said incoming media stream to a resource destination address associated with said enterprise, and wherein step (d) comprises:
     (i) determining a possible resource destination address for routing said incoming media stream based on said responses;
     (ii) determining if the possible resource destination corresponding to said resource destination address is available for routing said incoming media stream;
     (iii) if said possible resource destination is unavailable for routing said media stream, repeating steps (i) and (ii);
     (iv) if said possible resource destination is available for routing said media stream, routing said incoming media stream to said available resource destination.

2. The method of claim 1, wherein step (d) further comprises;
   (v) if all said determined possible resource destinations for routing said incoming media stream are unavailable, routing said incoming media stream to a default resource destination address.

3. A method for routing an incoming media stream comprising:
   (a) receiving a media stream comprised of one of a plurality of media stream types directed to an enterprise;
   (b) determining attribute data characteristic of said media stream from said media stream;
   (c) based on said attribute data, requesting information from one or more databases available in said enterprise;
   (d) based on responses to said information requesting step, routing said incoming media stream to a resource destination address associated with said enterprise; and
   (e) monitoring reception of said incoming media stream by a resource at said resource destination address
   (f) if said routed media stream has not been received by said resource within a predetermined time which time is dependent upon at least one of said media type and said attribute data, repeating steps (c), (d) and (e).

4. The method of claim 3, wherein said attribute data comprises at least one of:
   (i) said type of said media stream;
   (ii) address data of said media stream; and
   (iii) content data of said media stream.

5. The method of claim 4 wherein said media stream types comprise one of a voice over internet call, a public switched telephone network call, a facsimile transmission, an e-mail transmission, a web chat request, a web form, and a video call.

6. The method of claimed 5 wherein said media stream type comprises an e-mail and including the step of routing said e-mail with an acknowledgement receipt request.

7. The method of claim 5 wherein said media stream type comprises a facsimile transmission and including the step of attaching said facsimile transmission to an e-mail prior to routing said facsimile transmission.

8. The method of claim 7 including the step of routing said e-mail with attached facsimile transmission with an acknowledgement receipt request.

9. The method of claim 7 wherein said determining step comprises applying character recognition to said facsimile transmission to obtain a readable translation of said facsimile transmission and, analyzing said readable translation for certain keywords.

10. The method of claim 5 including the step of storing statistics on said routing of said media stream.

11. A method for routing an incoming media stream comprising:
   (a) receiving a media stream comprised of one of a plurality of media stream types directed to an enterprise;
   (b) determining attribute data characteristic of said media stream from said media stream;
   (c) based on said attribute data, requesting information from one or more databases available in said enterprise; and (d) based on responses to said information requesting step, routing said incoming media stream to a resource destination address associated with said enterprise, and wherein routing said media stream to said resource destination address comprises:
 (A) receiving information from said one or more databases available in said enterprise;
 (B) identifying a plurality of possible resource destination addresses based on said received information;
 (C) ranking said plurality of possible resource destination addresses based on said attribute data;
 (D) determining, by communication with said one or more plurality of databases available in said enterprise, the availability of a selected resource destination corresponding to a selected resource destination address;
 (E) if said selected resource destination is available, routing said incoming media stream to said available resource destination address;
 (F) if said selected resource destination is unavailable, repeating items (D) and
 (E) with alternate selected resource destination addresses.

12. A system for routing a plurality of types of media streams received by an enterprise comprising:
 (a) a processor;
 (b) a network communications device, in communication with said processor, for communications with at least one or a data network and a Public Switched Telephone System ("PSTN");
 (c) said network communications device also in communication with one or more databases of said enterprise;
 (d) memory in communication with said processor, said memory adapting said processor to:
  (i) receive an incoming media stream, comprising one of a plurality of media stream types, from one of said data network and said PSTN;
  (ii) identify attribute data characteristic of said media stream;
  (iii) based on said attribute data, request possible resource destination address information from said one or more enterprise databases; and
  (iv) route said media stream to a resource destination address based on responses to said requests;
  (v) determine if said routed media stream has been responded to within a predetermined time;
  (vi) if said routed media stream has not been responded to within said predetermined time frame, performing an alternate action on said media stream.

13. The method of claim 12, wherein said memory further adapts said processor to:
 (vii) store statistical data with respect to said routing of said incoming media stream.

14. The method of claim 12 wherein step (vi) comprises performing at least one of adjusting said media stream's response priority and re-routing said media stream to a resource destination address within said enterprise.

15. A computer readable medium for routing a plurality of types of media streams received at an enterprise, said computer readable medium comprising:
 (a) means for receiving the plurality of media stream types from a PSTN and a data network;
 (b) means for communicating with one or more databases of said enterprise;
 (c) means for forming attribute data from each of said media streams;
 (d) means for requesting data for determining a resource destination address within said enterprise by communication with said one or more databases, wherein said means for requesting data for determining a resource destination address further comprises:
  (i) means for receiving responses from said one or more enterprise databases; and
  (ii) means for ranking possible resource destination addresses based on said received responses;
 (e) means for routing said media streams to said resource destination address; and
 (f) means for storing data, said data corresponding to said receiving of the plurality of media streams and said routing of said media streams, and wherein said means for forming attribute data comprises means to identify at least one of said media stream's type, address data and content data.

16. The computer readable medium of claim 15, wherein said means for routing comprises:
 (i) means for selecting a resource destination address from said ranking;
 (ii) means for determining the availability of a resource destination corresponding to said selected resource destination address;
 (iii) if said selected resource destination address is available, routing said media to said selected resource; and
 (iv) if said selected resource destination is unavailable, repeating (I) and (ii).

17. The computer readable medium of claim 16, wherein said means for routing further comprises:
 (i) means for monitoring reception of said routed media stream by said selected resource;
 (ii) means for determining if said reception has not occurred within a predetermined time;
 (iii) if said reception has not occurred within said predetermined time; increasing the response priority of said media stream and repeating (d), (e) and (f).

18. The computer readable medium product of claim 17, further comprising:
 (g) means for storing statistical data corresponding to said routed media stream.

* * * * *